June 11, 1929.  D. I. REITER  1,716,462
FASTENER
Filed Oct. 2, 1928
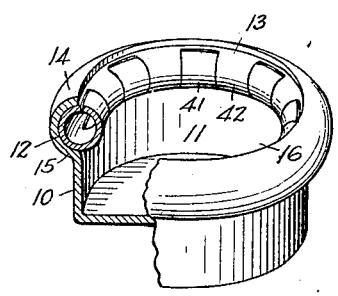
Fig. 1
Fig. 3
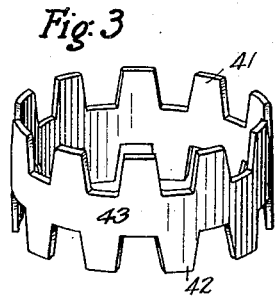
Fig. 2
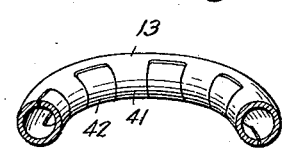
Fig. 5
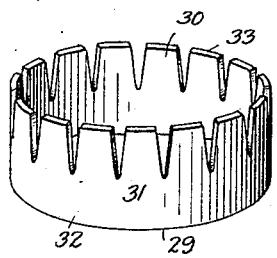
Fig. 4
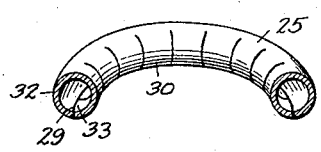
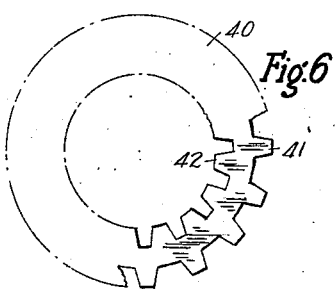
Fig. 6
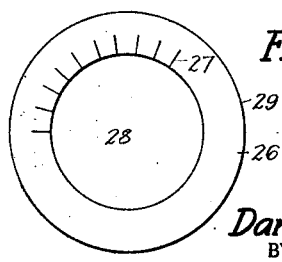
Fig. 7
INVENTOR
Daniel I. Reiter
BY
Harry Jacobson
ATTORNEY

Patented June 11, 1929.

UNITED STATES PATENT OFFICE.

DANIEL I. REITER, OF NEW YORK, N. Y.

FASTENER.

Application filed October 2, 1928. Serial No. 309,739.

This invention relates to the female element of snap fasteners, and particularly, to the yieldable member for maintaining the stud or male element of the fastener removably in place.

It has been customary heretofore to use an open spring ring as the resilient member of the female element of certain types of snap fasteners. Such an open ring has usually been inserted into the usual annular groove of the female member, and must necessarily be so loosely fitting that it can readily expand and contract in the groove, and therefore can be easily removed therefrom. Under the pressure of the stud or male element, the open spring ring must change both its inner and outer diameters as the stud enters and leaves the female element of the fastener, this being possible only when the spring ring is left open at its ends with sufficient clearance between the ends for this purpose.

My invention contemplates the provision of an endless yieldable member to replace the open ring above described. Said member is provided with resilient tongues on the inner surface thereof and the outer diameter is so fixed relatively to the groove in which the member is inserted that radial movement of the member is prevented and the danger of the member falling out of or being otherwise removed from the groove and thereby destroying the utility of the fastener, is eliminated.

The various objects of my invention will appear from the description which follows and from the drawings in which, Fig. 1 is a perspective view of one form of a female fastener element to which my improved yieldable member has been applied.

Fig. 2 is a similar view of part of the yieldable member.

Fig. 3 is a similar view of a blank from which said member may be formed.

Fig. 4 is a view similar to Fig. 2 of a somewhat modified form of my improved yieldable member.

Fig. 5 is a similar view of a blank from which the member shown in Fig. 4 may be made.

Fig. 6 is a plan view of a disc of flat sheet material from which the blank shown in Fig. 3 may be drawn or otherwise formed, and Fig. 7 is a similar view of a similar disc from which the blank of Fig. 5 may be made.

In that practical embodiment of my invention which I have illustrated by way of example, the female element 10 may take a variety of forms as is well known in the art depending on the function and type of the fastener. My invention is applicable with equal facility to slide fasteners, carpet fasteners, pronged fasteners and to the female element of many other types of snap fasteners. In the form illustrated in Fig. 1, the female element 10 is made in the form of a casing, being provided with a compartment as 11 closed at one end and adapted to receive and enclose the head of a male member or stud of the usual type and therefore not shown. At the upper or exposed end of the element 10, a suitable annular depression or groove as 12 is formed of the proper shape and size to receive the yieldable element 13, the outermost part of which is fitted in the groove preferably in such a manner as to prevent relative radial movement of the member and the walls of the groove, though circumferential movement may be possible. The walls of said depression are so formed as to provide a comparatively narrow uppermost lip or flange 14 and a lower lip or retaining flange 15 arranged to engage the member 13 and thereby to prevent removal of the member 13 after said member has been inserted into place, without destroying the walls of the groove or the member.

I prefer to make the yieldable member 13 of a single piece of appropriate sheet material such as brass or the like, and to make the greatest diameter of the member substantially equal to the greatest internal diameter of the groove 12, though it will be understood that some looseness is sometimes permissible to allow proper alignment of the fastener elements. I also prefer to insert said member 13 into the groove 12 before bending over the lip 14 on to the member and to thereby secure the member permanently in place against removal in any direction. The yieldable member 13 is preferably made in the form of an endless hollow ring, in the form of a hollow annular solid of revolution, and a radial cross-section thereof, that is, a cross-section by a plane including the axis or center line of the entire ring may be of circular, elliptical, rectangular, polygon or any other form consisting of a pair of concentric, similar, plane geometric figures of closed outline, as may be found convenient or desirable. Since the ring is preferably formed of a single piece of sheet material by my improved process, I will describe the ring and the process of making it at the same time.

Referring now to that form of the yieldable member 25 illustrated in Fig. 4, an annular disc as 26 (Fig. 7) is stamped or otherwise cut from sheet material with the spaced radial slits 27 extending from the innermost opening 28 part-way to the outermost edge 29. After the disc has been stamped out in its flat form, it is then drawn into the tubular form 31 illustrated in Fig. 5 wherein the outermost half of the disc is contracted and the innermost half expanded to form a tube of substantially the same diameter throughout. On said tube, the upstanding tongues 30 are somewhat spaced and may be of any suitable form, depending upon the shape of the slits 27. As illustrated in Fig. 5, the sides of said tongues 30 taper inwardly toward the upper edge of the tube. If it is desired that the edges of the tongues meet when the tube is bent into its final form as a ring, the edges may be otherwise shaped.

The next step in the process is the formation from the tube of the endless ring 25. This is done by rolling the tongues 30 over inwardly so as to form the inner half of the member 25. At the same time, if desired, or later, the outermost portion 32 of the tube is also rolled inwardly to form the outer half of the member 25 so that the ends 33 of the tongues 30 become arranged adjacent to or somewhat spaced from what was the outer edge 29.

It will be understood that the rolling operation may be performed by the tools customarily used for that purpose and may be more or less imperfect. The resulting member which I have termed a ring, may not therefore be of perfectly circular cross-section as illustrated in Fig. 4 but said member 25 may assume other cross-sections depending upon the accuracy of the rolling operation, and the care with which it is done. However, since the cross-sectional shape of said member is comparatively unimportant and does not adversely affect the operation of said member, said cross-section may be greatly varied as may be found convenient or desirable. In fact, I have found that the outer half 32 of the ring may take the form of a substantially vertical wall, and that the tongues 30 forming the inner half of the member may also be arranged substantially vertical without detracting from the efficiency of the member provided that the ends of the tongues be curved slightly outwardly so as not to obstruct the passage of the stud element of the fastener.

In the formation of the modified form 13 of my improved yieldable member, the annular disc 40 is provided with outer spaced tongues 41 and inner spaced tongues 42. The spaces between the outer tongues 41 are designed to be closed by the inner tongues 42 and the spaces between the tongues 42 are designed to be substantially closed by the outer tongues 41. After the disc has been stamped in a manner well known in the art from sheet material it is drawn into the substantially cylindrical tube 43.

As will be understood by those versed in the art of drawing metal, the spaces between the tongues 41 are contracted whereas those between the tongues 42 are expanded by the drawing operation. It will therefore be evident that the tongues and spaces therebetween should be so designed that when the disc is drawn into its tubular form, all of the tongues and the spaces between them should be of substantially corresponding size and shape.

The formation of the tube 43 into the endless ring 13 is performed in a manner similar to that described in connection with the member 25. The tongues 41 are rolled inwardly and downwardly to form part of the inner wall or surface of the member 13 while the tongues 42 are rolled inwardly and upwardly to substantially close the spaces between the tongues 41. If desired, the ends of the tongues may reach to the bottoms of the corresponding spaces, though I prefer to space the ends of the tongues somewhat from the bottoms of the spaces in order to provide more room for the yielding of said tongues under the pressure of the stud passing thereby. However, as has been explained in connection with the element 25, the member 13 need not necessarily be of the circular cross-section shown.

After the member 13 or 25, as the case may be, has been inserted into the groove 12, and the lip 14 of the mounting or casing 10 has been flanged over to retain the member in position, it will be seen that the outer half of the member 13 or 25 is substantially enclosed by the wall of the groove 12 and that the inner half of said member overhangs the opening 16 in the upper end of the casing or mounting 10. On the insertion of the enlarged head of the well known stud into the compartment 11, the stud by its pressure on the tongues 30 or 41 and 42 causes said tongues to yield inwardly and to allow the enlarged head to pass thereby. When the head has passed the yieldable member, the tongues forming the inner wall thereof are free to expand and to obstruct the removal of the enlarged head of the stud from the mounting. However, when sufficient upward pressure is put upon the stud to draw the stud upwardly past the tongues, said tongues yield radially under the pressure of the stud and allow said stud to be withdrawn from the mounting.

It will be evident that while the yieldable member 13 or 25 is inserted comparatively tightly into the groove 12, said member is otherwise entirely independent of the mounting or casing 10 and may be fitted loosely enough to allow circumferential movement thereof relatively to the walls of the groove. It will also be seen that if desired, the outer diameter of the yieldable member may be made slightly less than the greatest internal diameter of the groove 12 so that said yieldable member may bodily adjust itself to some extent in the groove 12, should such adjustment prove to be desirable.

While I have shown and described certain preferred embodiments of my invention, I do not intend to be understood as limiting myself thereto since I intend to claim my invention as broadly as may be permitted by the state of the prior art and the terms of the appended claims.

I claim:

1. In a female snap fastener element having a compartment for the reception and concealment of the head of a stud inserted thereinto, an integral bottom on the element closing one end thereof, a rim having an upwardly and inwardly bent continuous groove, at the other end of the element, a yieldable endless ring arranged in the groove below the top of the element, approximately half of the surface of said ring being substantially unyieldable, encompassed and engaged by the wall of said groove and the other half being of substantially the same cross-sectional shape as the first-mentioned half and diametrically opposed thereto and being yieldable and exposed.

2. In a female snap fastener element provided with a rim having a continuous annular groove, a radially yieldable endless hollow ring member of substantially the height of the groove and having a central opening therein, fitted into said groove and permanently maintained therein against removal, with part of the member projecting inwardly beyond the groove and below the top of the element, the walls of the groove being in contact with the outer surface of the member from the uppermost central portion of the member to the lowermost central portion thereof, said member having a fixed outermost diameter and having a cross-section which is substantially symmetrical about the circular interior axis thereof.

3. In a female snap fastener element, a mounting terminating in a rim having a continuous annular groove, an endless annular member having an outer half fitted into said groove, and resilient tongues extending from the remaining half, forming the innermost half of the member, the wall of said groove being of the same shape and size as the outer half of the member and substantially enclosing the outer half and maintaining said member permanently in the groove, the outer half of the member being of substantially the same cross-section as the inner half and diametrically opposed thereto.

4. In a female snap fastener element, a mounting terminating in a rim provided with a continuous annular groove, a hollow endless ring yieldable radially about its inner surface and fitted into said groove, said ring being of no greater height than that of said groove and of material of less thickness than the horizontal depth of said groove, the walls of said groove being bent through an angle of at least 180° about the ring to maintain the ring permanently in place while exposing only the inner yieldable surface of said ring and enclosing the entire outer portion of said ring.

5. In a female snap fastener element, a hollow ring, resilient tongues, yieldable radially on the inner half of said ring, and means for permanently enclosing the entire outer half of said ring and exposing the inner resilient half thereof, comprising a mounting, and ring-maintaining walls on said mounting bent about the entire outer half of the ring, the enclosed outer half and the exposed inner half of the ring having identical cross-sections.

6. In a female snap fastener element, a mounting adapted to receive and enclose the head of a stud inserted thereinto, and means for resisting the entrance and removal of the stud into and from said mounting, comprising a wall bent through an angle of at least 180° and forming the terminal upper end of said mounting and thereby providing a continuous annular groove in the mounting, and an endless hollow resilient ring of relatively thin sheet material independent of said mounting, fitted into said groove and partly enclosed by said walls with the inner surface thereof projecting inwardly past the inner limits of the groove and of no greater height than that of said groove.

7. In a female snap fastener element, a yieldable hollow endless ring in the form of a hollow annular solid of revolution adapted to be formed from a single disc of sheet material and including a solid and comparatively unyielding outer wall and a series of tongues continuous and integral with the outer wall and forming the inner wall of said ring, and means for engaging and enclosing the outer unyielding wall whereby said tongues project inwardly of said means for resisting the movement of a stud past said tongues in either direction.

8. In a female snap fastener element, a mounting open at its upper end and having a compartment adapted to receive and enclose the head of a stud inserted thereinto through said opening, a bent wall forming the upper end of said mounting and providing an annular groove immediately below said opening, and a hollow endless ring having a central opening for the passage of the stud fitted into the annular groove and having an outermost diameter substantially equal to that of the greatest internal diameter of said groove, the wall of said groove enclosing the outer half of said ring and allowing the inner half to project inwardly past the edge of the opening in the mounting, said ring having tongues extending inwardly from said outer half and forming the inner half of the ring and being arranged for radial movement relatively to said opening by the pressure of a stud head thereon, and said ring permanently restricting the diameter of said opening and having a cross-section at any point included between a pair of similar concentric plane geometric figures each of closed outline, symmetrical about a vertical center line thereof.

9. A yieldable member adapted to be inserted into and permanently held in the interior of the female element of a snap fastener comprising an endless ring of fixed outer diameter and relatively little height and thickness and having a central opening therein, and having yieldable tongues arranged about said opening, the radial cross-section of said ring at any given point thereof being a pair of concentric similar plane geometric figures each of closed outline.

10. The process of forming an endless hollow ring adapted for use as the resilient member of the female element of a snap fastener, comprising stamping an annular disc having radially arranged tongues therein from a piece of sheet material, drawing said annular disc into a cylinder of tubular form, and of the same diameter throughout, and rolling the tongues and the remainder of the disc inwardly toward each other until one tongued end of the cylinder substantially meets the opposite end of the cylinder.

11. The process of making a resilient element for a female snap fastener comprising stamping an annular disc with tongues therein on at least one edge from sheet material, drawing said disc into a cylindrical tube of the same diameter throughout with said tongues on at least one end of the tube, and bending the upper and lower ends of the tube inwardly toward each other until they meet.

12. A snap fastener comprising a member terminating in a rim of substantially semi-circular cross-section and providing an internal substantially semi-circular continuous annular groove, and a hollow ring of thin sheet material in the form of a hollow annular solid of revolution, having a wall forming the surface thereof, said wall being circular in cross-section and having substantially the same diameter as that of the groove, the outer half of said wall being substantially in contact throughout with the wall of the groove and the inner half of the wall being yieldable and projecting inwardly of the groove, the greatest height of the ring being not greater than that of the groove.

Signed at New York, in the county of New York, and State of New York.

DANIEL I. REITER.